(12) United States Patent
McBride

(10) Patent No.: US 9,706,783 B1
(45) Date of Patent: Jul. 18, 2017

(54) Y-BONE FISH FILLET KNIFE, KNIFE BLADE AND METHOD OF DEBONING

(71) Applicant: Tadd McBride, Riverton, UT (US)

(72) Inventor: Tadd McBride, Riverton, UT (US)

( * ) Notice: Subject to any disclaimer, the term of this patent is extended or adjusted under 35 U.S.C. 154(b) by 0 days.

(21) Appl. No.: 15/453,897

(22) Filed: Mar. 8, 2017

Related U.S. Application Data

(60) Provisional application No. 62/305,691, filed on Mar. 9, 2016.

(51) Int. Cl.
*A22C 25/00* (2006.01)
*A22C 25/16* (2006.01)
*B26B 9/02* (2006.01)
*B26B 3/00* (2006.01)

(52) U.S. Cl.
CPC ............ *A22C 25/16* (2013.01); *A22C 25/006* (2013.01); *B26B 3/00* (2013.01); *B26B 9/02* (2013.01)

(58) Field of Classification Search
CPC ...... A22C 25/16; A22C 25/163; A22C 25/185
USPC ............ 452/6, 12, 13, 16, 17, 102–106, 135
See application file for complete search history.

(56) References Cited

U.S. PATENT DOCUMENTS

| | | | | |
|---|---|---|---|---|
| 1,546,975 A * | 7/1925 | Feller | ................... | A22C 25/006 30/286 |
| 1,988,386 A * | 1/1935 | Komperud | .......... | A22C 25/006 30/314 |
| 2,630,314 A * | 3/1953 | Cadwallader | ......... | B26B 11/006 177/129 |
| 3,996,645 A * | 12/1976 | Bordewick | ............ | A22C 25/17 452/128 |
| 5,453,043 A * | 9/1995 | Monson | .................. | A22B 5/205 30/162 |
| 6,503,137 B2 * | 1/2003 | Maille | .................. | A47G 21/061 30/120.1 |
| 7,214,127 B1 * | 5/2007 | Thompson | ............. | A22B 5/168 452/103 |
| 7,487,565 B1 * | 2/2009 | Sundling | ............... | A01M 31/00 294/153 |
| 7,578,731 B1 * | 8/2009 | Moore | ................. | A22B 5/0047 452/103 |
| 8,066,557 B2 * | 11/2011 | Tarrant | ..................... | A22B 3/10 452/107 |
| 8,235,775 B1 * | 8/2012 | Moy | .................... | A22B 5/0047 452/160 |
| 8,382,562 B1 * | 2/2013 | Lavretsky | ............ | A22B 5/0047 452/102 |
| 8,512,107 B1 * | 8/2013 | Grover | ................ | A22B 5/0047 452/132 |
| 8,690,647 B1 * | 4/2014 | Kitscha | ................ | A22B 5/0005 452/132 |
| 8,992,289 B2 * | 3/2015 | Ramos | ..................... | B26B 3/00 452/132 |

* cited by examiner

*Primary Examiner* — Richard Price, Jr.
(74) *Attorney, Agent, or Firm* — Paul C. Oestreich; Eminent IP, P.C.

(57) ABSTRACT

The invention is a Y-bone fish fillet knife, a specialized Y-bone fish fillet knife blade and methods of using same to debone fish having Y-bones. Features of the novel Y-bone fish fillet knife and its specialized knife edge include an intentionally unsharpened, or rounded edge, notched groove and an arcuate cutting edge. The rounded notched groove tracks and slides along the Y-bones during cutting. The cutting edge may have other shapes and be dual-edged according to other embodiments. The knife and its handle are designed for ambidextrous use.

15 Claims, 7 Drawing Sheets

Y-BONE FISH FILLET KNIFE, KNIFE BLADE AND METHOD OF DEBONING

CROSS-REFERENCE TO RELATED APPLICATIONS

This US non-provisional patent application claims benefit and priority to U.S. provisional patent application No. 62/305,691 filed on Mar. 9, 2016, titled "Y-BONE FISH FILLET KNIFE, EDGE AND METHOD OF USING SAME", the contents of which are incorporated by reference as if fully set forth herein.

BACKGROUND OF THE INVENTION

Field of the Invention

The present invention relates generally to knives. More particularly, this invention relates to a Y-bone fish fillet knife, a specialized Y-bone knife blade and method of deboning fish with Y-bones.

Description of Related Art

As a general rule, one must "clean" fish prior to consumption. The head, tail and guts of the fish are generally easy to remove with a standard fillet knife. Depending on the fish, the most difficult part of cleaning a fish is the removal of the bones. Pike are known to be among the best tasting freshwater fish, but many anglers resist cleaning and eating Pike because of all the Y-bones inside.

There are a number of conventional techniques for removing the Y-bones from fish fillets using a conventional fish fillet knife. However, these techniques rely upon considerable expertise and practice to correctly remove the Y-bones from fish.

Accordingly, there exists a need in the art for specialized knife edges, knives incorporating same and methods of using such knife edges and knives that simplify the process of removing Y-bones.

SUMMARY OF THE INVENTION

The invention is a Y-bone fish fillet knife, a specialized Y-bone fish fillet knife blade and methods of using same to debone fish having Y-bones or other rib cage bones extending from centralized fish skeletal structure. General embodiments of the knife, knife blade and method are described below.

An embodiment of a Y-bone knife blade is disclosed. The embodiment of a knife blade may include a knife shank having a proximal end and a distal end and a top edge and a bottom edge. The embodiment of a knife blade may further include a notched groove disposed into the bottom edge of the shank near the distal end, wherein edges inside the notched groove are rounded. The embodiment of a knife blade may further include a cutting tang disposed at the distal end of the shank, the cutting tang bounded by the notched groove, a cutting edge, the distal end of the knife shank and the top edge of the knife shank.

An embodiment of a Y-bone fish fillet knife is disclosed. The embodiment of a Y-bone fish fillet knife may include a knife shank having a proximal end, a distal end, a top edge and a bottom edge. The embodiment of a Y-bone fish fillet knife may further include a notched groove disposed into the bottom edge of the shank near the distal end of the shank, wherein edges inside the groove are rounded. The embodiment of a Y-bone fish fillet knife may further include a cutting tang disposed at the distal end of the shank, the cutting tang bounded by the notched groove, a cutting edge, the distal end of the knife shank and the top edge of the knife shank. The embodiment of a Y-bone fish fillet knife may further include a handle connected to the proximal end of the knife shank.

An embodiment of a method of deboning a fish having Y-bones is disclosed. The embodiment of a method of deboning a fish having Y-bones may include providing a Y-bone fish fillet knife. The embodiment of a Y-bone fish fillet knife may include a knife shank having a proximal end, a distal end, a top edge and a bottom edge. The embodiment of a Y-bone fish fillet knife may further include a notched groove disposed into the bottom edge of the shank near the distal end of the shank and extending to a groove end, wherein edges inside the groove are rounded. The embodiment of a Y-bone fish fillet knife may further include a cutting tang disposed at the distal end of the shank, the cutting tang bounded by the notched groove, a cutting edge, the distal end of the knife shank and the top edge of the knife shank. The embodiment of a Y-bone fish fillet knife may further include a handle connected to the proximal end of the knife shank. The embodiment of a method of deboning a fish having Y-bones may include gripping the handle. The embodiment of a method of deboning a fish having Y-bones may include cutting adjacent and parallel to skeletal structure of the fish, wherein the Y-bones are guided into the notched groove and slide along the groove end during cutting.

BRIEF DESCRIPTION OF THE SEVERAL VIEWS OF THE DRAWINGS

The following drawings illustrate exemplary embodiments for carrying out the invention. Like reference numerals refer to like parts in different views or embodiments of the present invention in the drawings.

DETAILED DESCRIPTION OF THE INVENTION

The present invention is a Y-bone fish fillet knife, a specialized Y-bone fish fillet knife edge and methods of using same to debone fish having Y-bones. Because of the peculiar Y-shaped bones in certain fish, e.g., pike, it becomes more challenging to clean such fish. While standard fish fillet knives can be used to debone Y-bones, there tends to be more wasted flesh as it is tempting to just discard the portion of fish fillet with the Y-bones in it. The specialized Y-bone fish fillet knife edge disclosed herein simplifies the task of deboning fish containing Y-bones. While the primary motivation for using the knife, blade and methods described herein is for deboning fish with Y-bones, it may also be used for any other fish that has other types of bones, e.g., pin bones, extending from skeletal structure of a fish.

Figure 5:
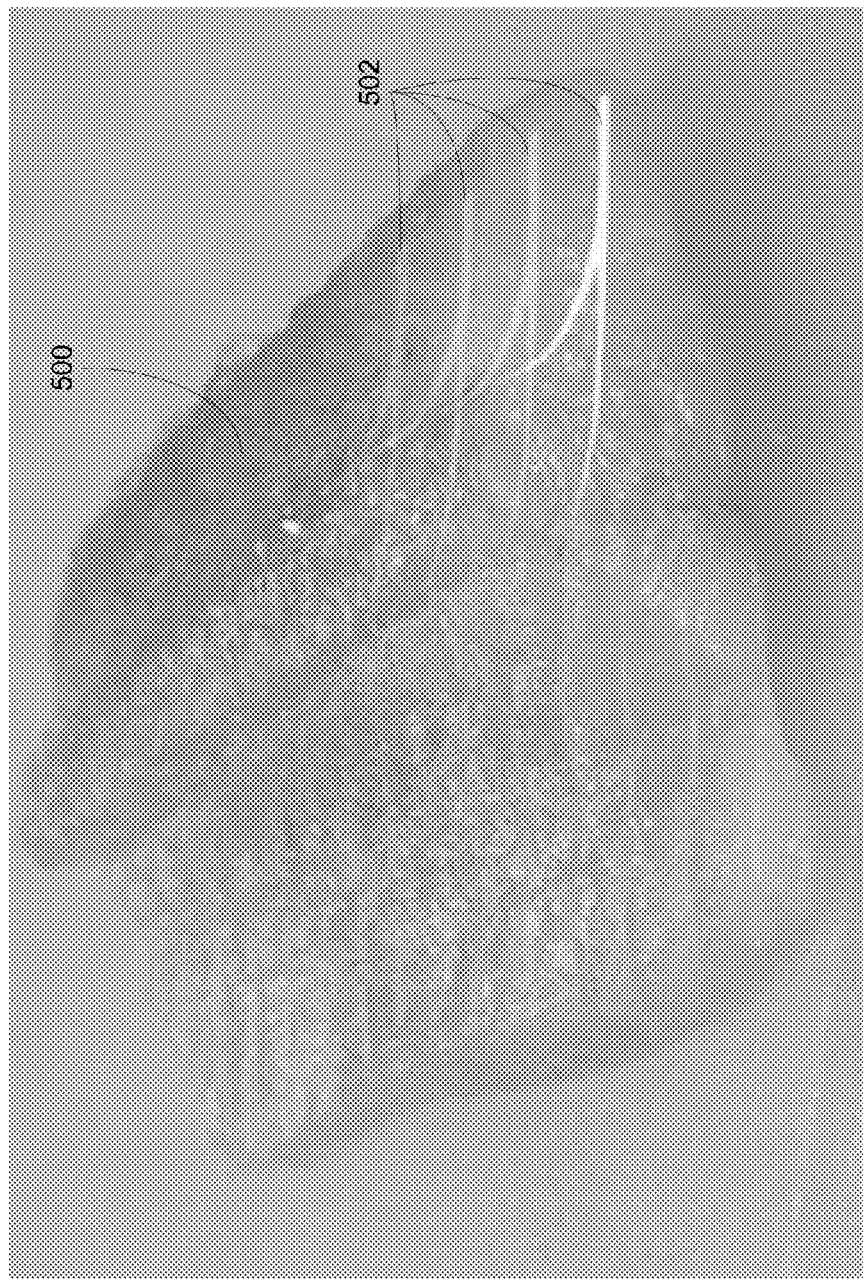
FIG. 5 is an exemplary image of a fish fillet showing the approximate position of the Y-bones located inside an exemplary fish fillet.

FIG. 5 is an exemplary image of a fish fillet 500 showing the approximate position of the Y-bones 502 (four shown and white in color) located inside an exemplary fish fillet 500. Although there are only 4 Y-bones 502 visible in FIG. 5, it will be understood that there are many more running along through the fish fillet 500.

Figure 7:
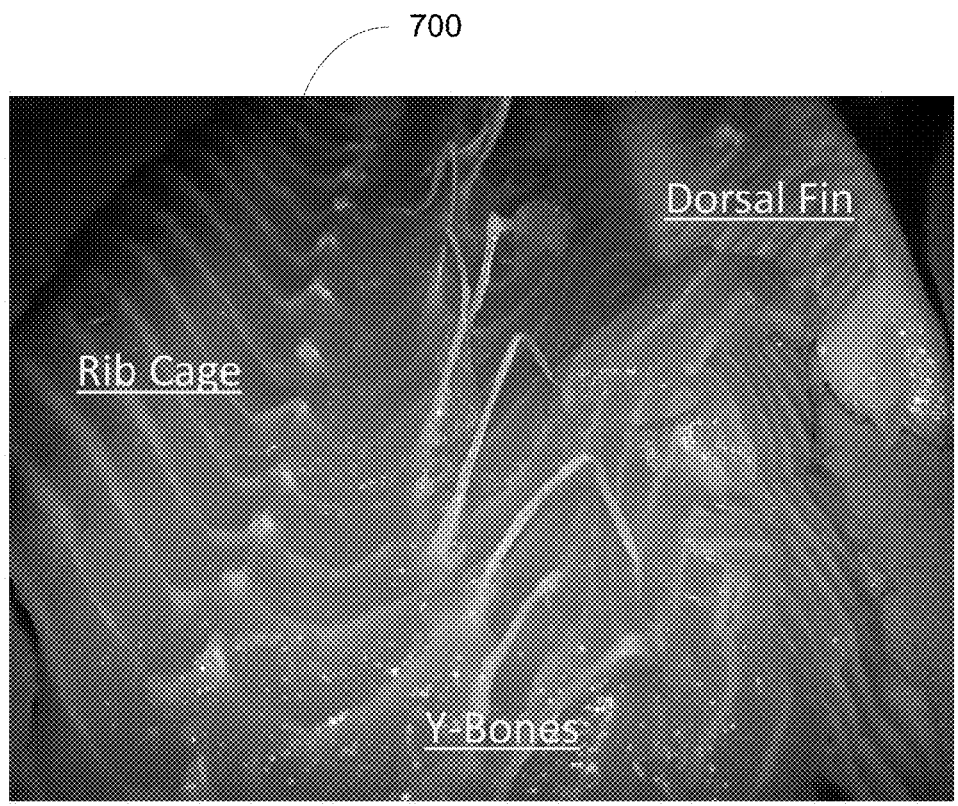
FIG. 7 is an image of a salmon fillet that has been deboned using an embodiment of a Y-bone fish fillet knife as described herein.

FIG. 7 is an image of a salmon fillet 700 that has been deboned using an embodiment of a Y-bone fish fillet knife as described herein. More particularly, FIG. 7 is a photo of a salmon fillet that shows how the flesh is removed from the Y-bones. In this particular instance, the Y-bones were removed using both a conventional, or regular, fillet knife and the Y-bone fish fillet knife and blade disclosed herein. In the salmon fillet cut illustrated in FIG. 7, an initial cut was made with a regular fillet knife to get down to the Y-bones. The second cut was made with the inventive Y-bone fish fillet knife over the top of the Y-bones. The final cut(s) to obtain the fillet would then be finished with a standard fillet knife. This particular image shown in FIG. 7 illustrates one cut below the Y-bones with a standard fillet knife. One particular embodiment of the Y-bone fish fillet knife cuts the flesh from the skeleton approximately ½" below the Y-bones.

Figure 1:
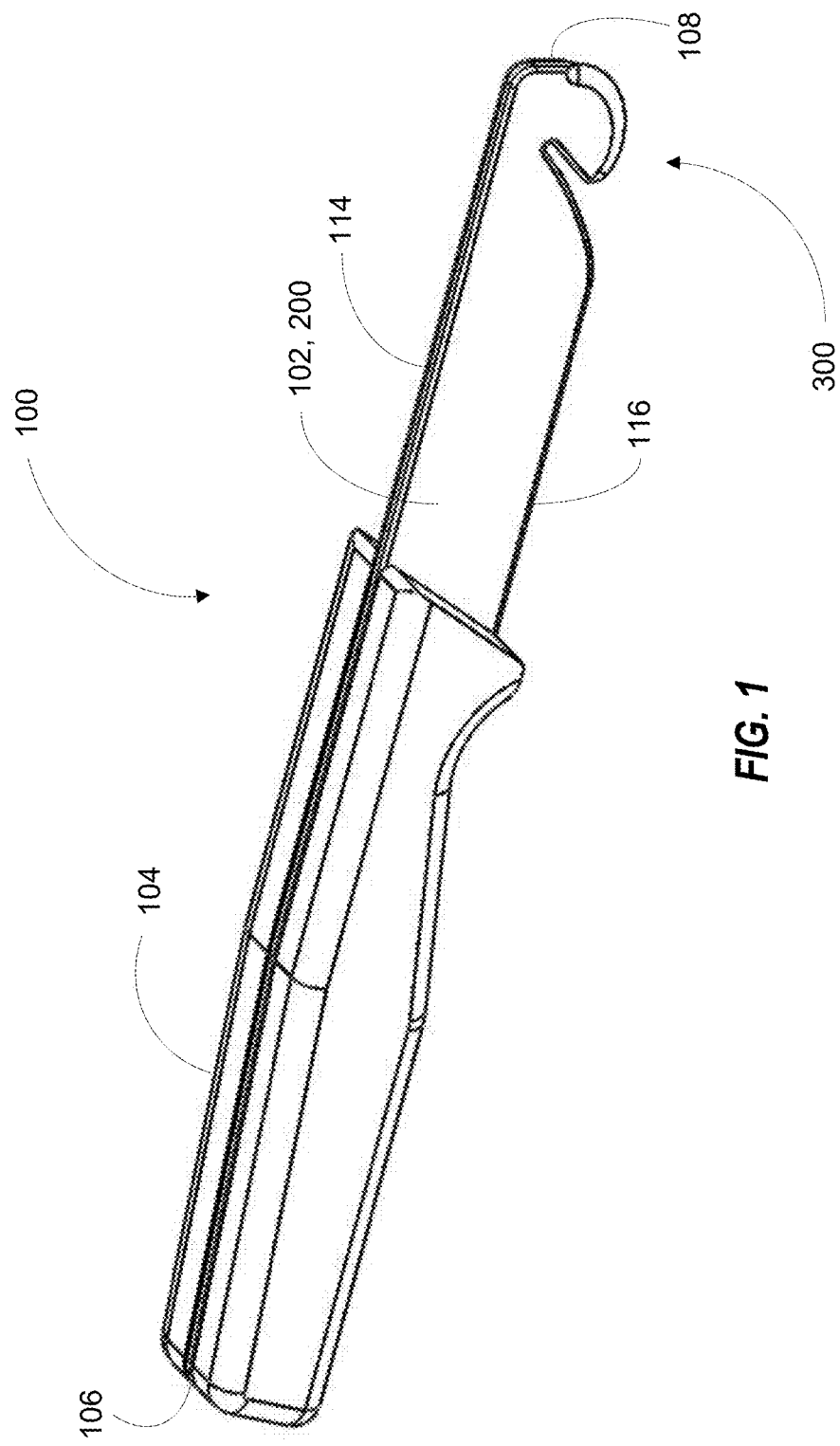
FIG. 1 is a perspective view of an embodiment of a Y-bone fish fillet knife, according to the present invention.

FIG. 1 is a perspective view of an embodiment of a Y-bone fish fillet knife, shown generally at arrow 100, according to the present invention. Knife 100 may include a knife blade 200, according to one embodiment. The knife blade 200 may be formed of a knife shank 102, having a proximal end 106 connected to a knife handle 104. The knife handle 104 may have any suitable shape for gripping by the hand and need not be of the particular shaped embodiment shown in FIG. 1. A specialized Y-bone knife edge, shown generally at arrow 300, is formed into the distal end 108. Further details regarding the Y-bone knife edge 300 are discussed below with reference to FIG. 3.

Figure 2:
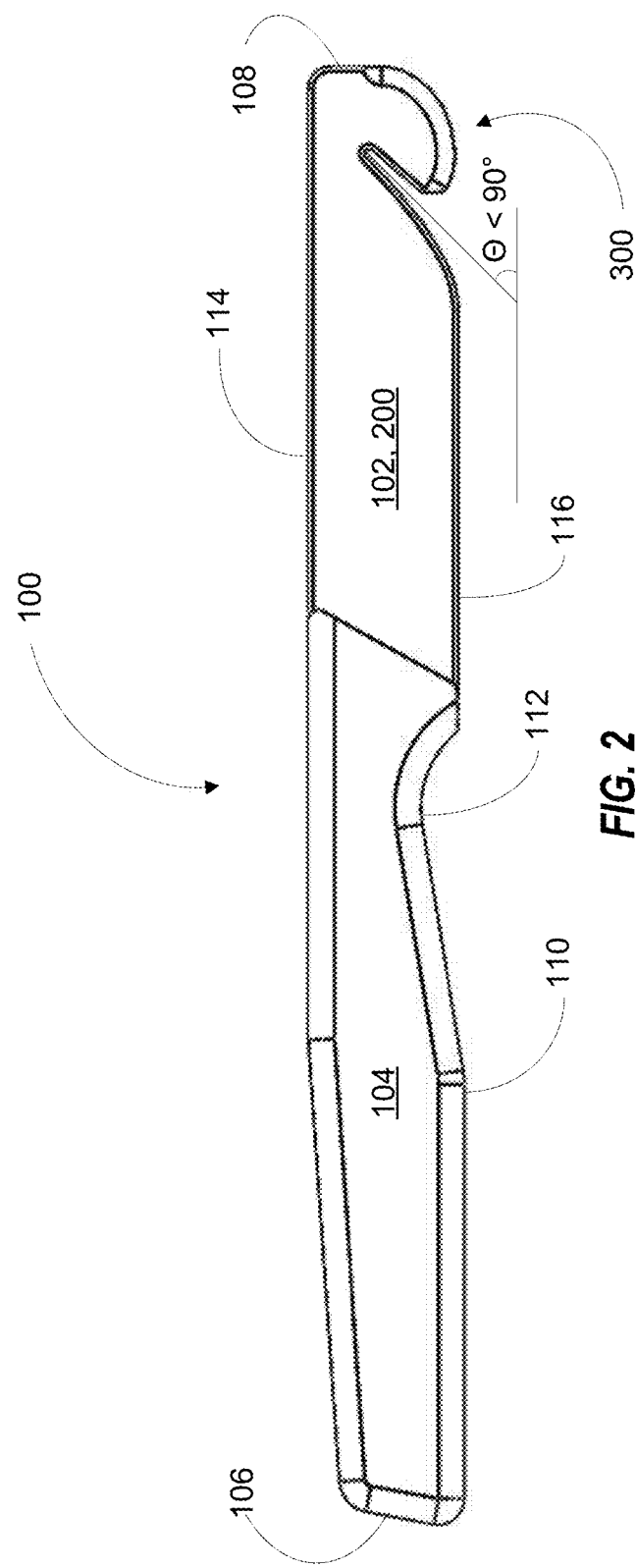
FIG. 2 is a side view of the Y-bone fish fillet knife shown in FIG. 1, according to the present invention.

FIG. 2 is a side view of the Y-bone fish fillet knife 100 shown in FIG. 1, according to the present invention. As noted above, the knife handle 104 may have any suitable shape. The embodiment of knife handle 104 may include a finger indentation 112 on the bottom end 110 to facilitate wrapping fingers around the handle 104 for using the knife 100. The handle may be formed of any suitable material, e.g., and not by way of limitation, wood, plastic, carbon fiber composite, metal, metal alloy, or any other material that has been used a handle for a knife. The knife shank 102 and knife blade 200 may also be formed of any material including, e.g., and not by way of limitation, carbon steel, stainless steel, tool steel, alloy steel, cobalt alloy, titanium alloy and ceramics.

Figure 3:
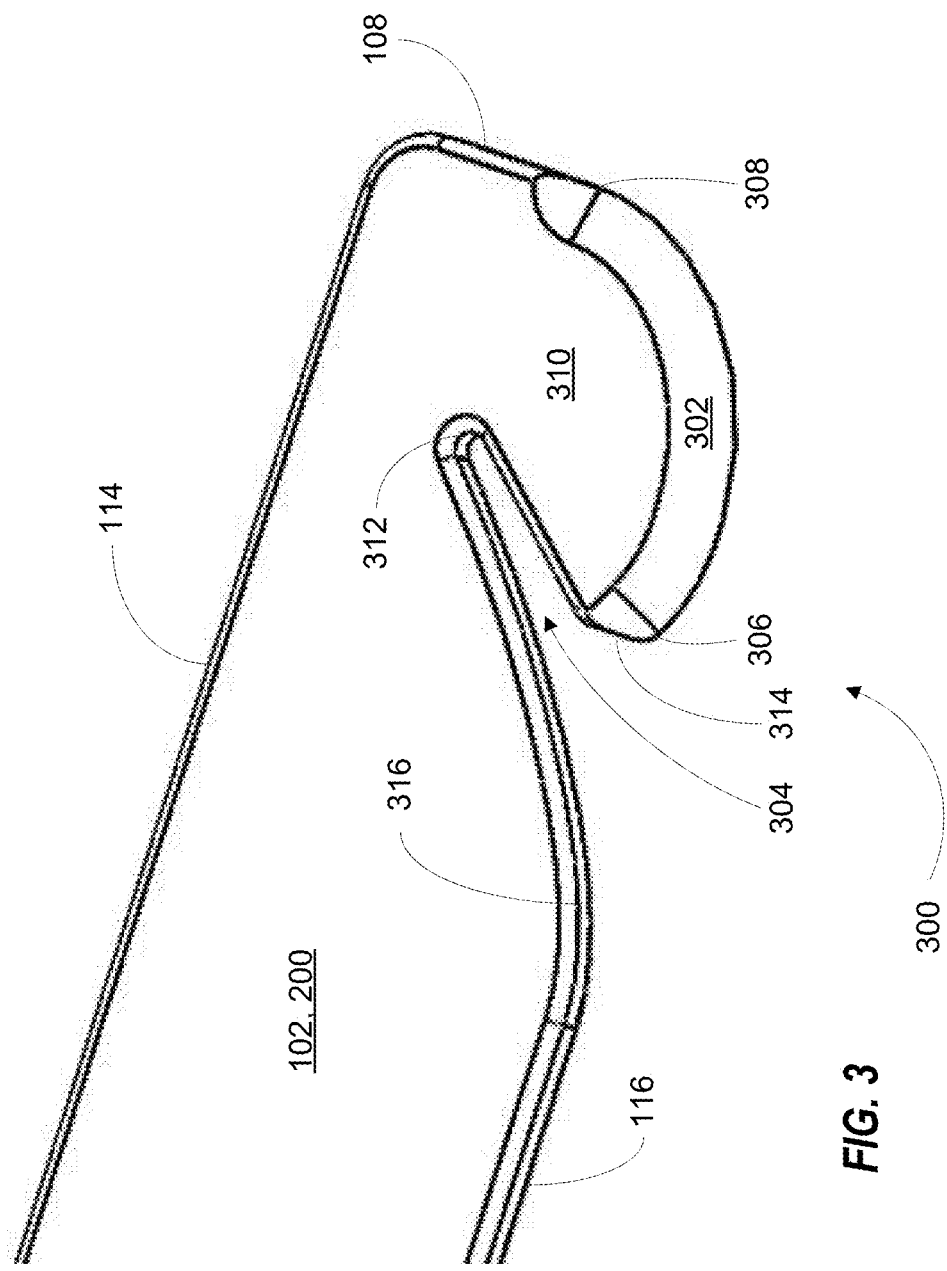
FIG. 3 is a close-up view of the Y-bone fish fillet knife edge illustrated in FIGS. 1 and 2, according to an embodiment of the present invention.

FIG. 3 is a close-up view of the Y-bone fish fillet knife edge 300 illustrated in FIGS. 1 and 2, according to an embodiment of the present invention. The Y-bone knife edge 300 on the distal end 108 of knife shank 102 includes a notched groove, see general at arrow 304 which defines a cutting tang 310 connected to the shank 102. The knife blade 200 is formed from the knife shank 102. Cutting tang 310 includes a cutting edge 302. The cutting edge 302 is the only portion of the knife shank 102 that is sharpened for cutting flesh. More particularly, the cutting edge 302 is sharpened between proximal sharp end 306 and distal sharp end 308. The remaining edges of the Y-bone fish fillet knife shank 102 may be generally rounded or unsharpened according to various embodiments of the knife blade 200 and knife shank 102. The notched groove 304 may be configured to receive the Y-bones during deboning according to the present invention.

The notched groove 304 may be deliberately unsharpened, i.e., rounded, so that the groove end 312 does not cut into the Y-bones, but rather brushes up against them during the deboning procedure. Cutting edge 302 is used to separate the fish fillet from the adjacent Y-bones. Another feature of groove 304 is that the leading 314 and trailing 316 groove edges are intentionally rounded and unsharpened. More particularly, the leading groove edge 314 is rounded and unsharpened so that the Y-bones are not cut while being fed into groove 304. Likewise, the trailing groove edge 316 is rounded and shaped with a radius to assist in aligning and feeding the Y-bones into groove 304.

The illustrated embodiment of cutting edge 302 includes only one angled cutting edge 302 relative to the faces of knife shank 102. However, it will be understood that two angled knife cutting edges (not shown) relative to the faces of knife shank 102 will also suffice for a cutting edge 302, according to another embodiment of a Y-bone fish fillet knife. Such "dual-angled" knife cutting edges are well known in the art and will not be further detailed herein. It will also be understood that other shapes of the cutting edge 302, not just the arcuate shape shown in FIGS. 1-3, will perform adequately and are contemplated to be within the scope of the present invention. For example, and not by way of limitation, straight, polygonal, serrated and any other suitable shape of cutting edge 302 are also useful for filleting fish and are alternative embodiments of a cutting edge used in the inventive Y-bone fish fillet knife, knife blade and methods described herein.

Figure 4:
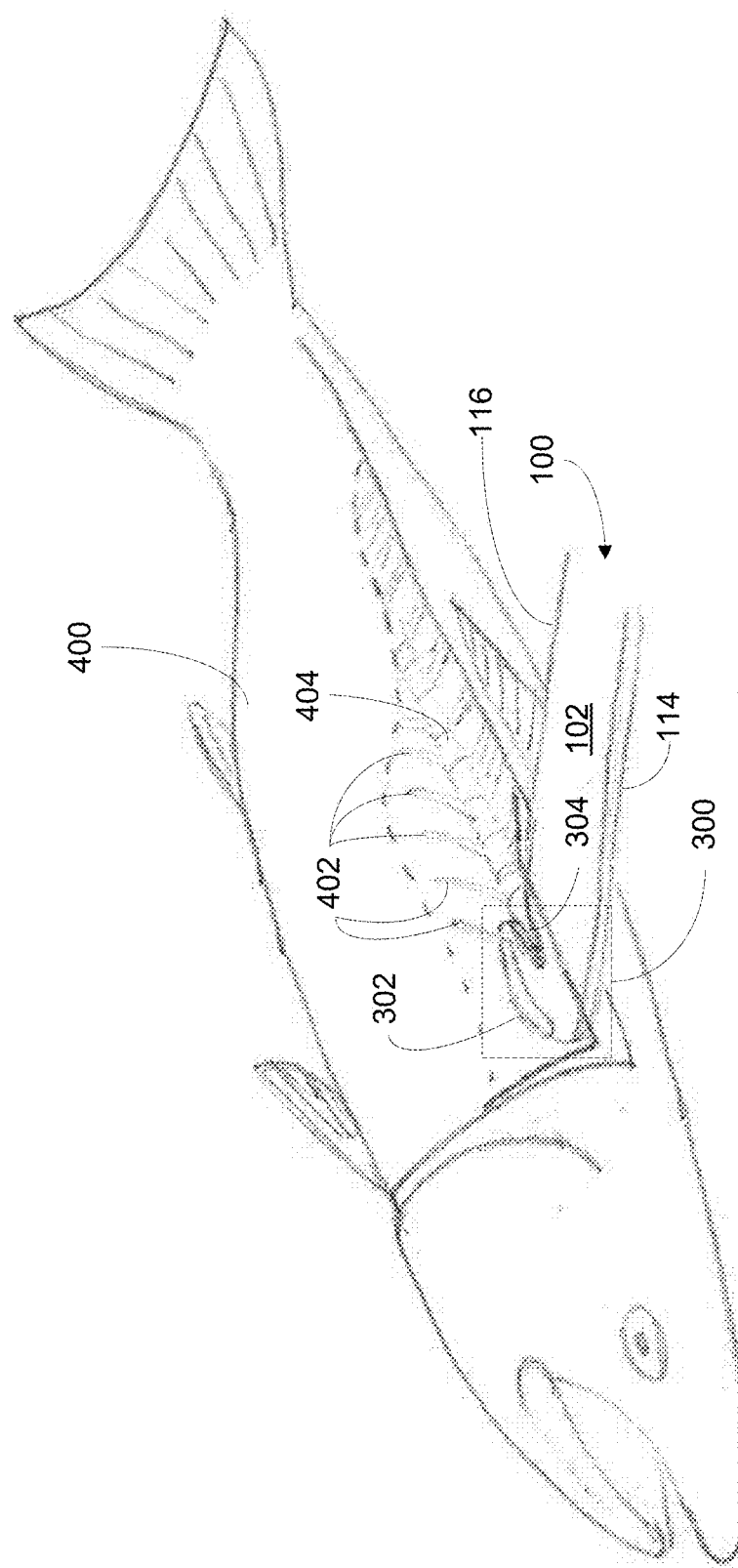
FIG. 4 is a perspective view of the Y-bone knife edge as it would be used to debone Y-bones from an exemplary fish, according to a method embodiment of the present invention.

FIG. 4 is a perspective view of the Y-bone knife edge 300 as it would be used to debone Y-bones 402 from an exemplary fish 400, according to a method embodiment of the present invention. A standard fillet knife (not shown) may first be used to cut the fish flesh away from the skeletal structure of the fish down to the top of the Y-bones 402. The Y-bone knife 100 is then inserted so that the notched groove 304 of the Y-bone knife edge, inside dashed line box 300, aligns with the Y-bones 402 and assists to control the direction of the knife cut. During the deboning cut, the Y-bones 402 bend and flex as the cutting edge 302 separates the flesh from the skeletal structure. Note that the notched groove 304 does not cut into the Y-bones 402 because the notched groove 304 has rounded edges. The Y-bone knife 100 cuts and separates the flesh away from the skeletal structure 404 to a point below the Y-bones 402. The loose end of fillet is then flipped out of the way so that the standard fillet knife (not shown) may be used again to remove the fillet from the remaining rib skeletal structure 404. When complete you have a bone free fillet that does not need a secondary operation to remove the Y-bones 402.

Figure 6:
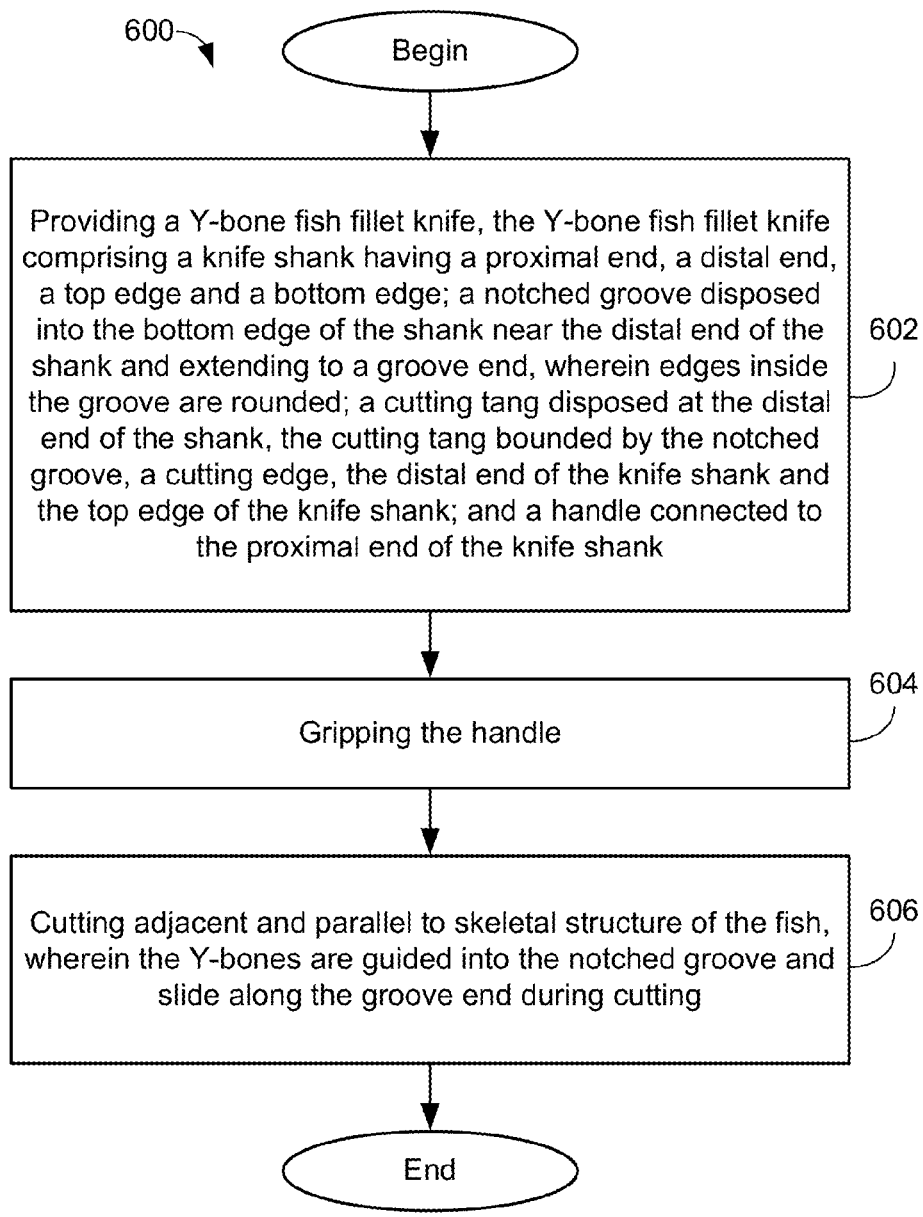
FIG. 6 is a flow chart of an embodiment of a method of deboning a Y-bone fish fillet according to the present invention.

FIG. 6 is a flow chart of an embodiment of a method of deboning a Y-bone fish fillet 600 according to the present invention. The method of deboning a fish 600 may include providing 602 a Y-bone fish fillet knife the Y-bone fish fillet knife 100. According to this embodiment of method 600, Y-bone fish fillet knife 100 may include a knife shank 102 having a proximal end 106, a distal end 108, a top edge 114 and a bottom edge 116. According to this embodiment of method 600, Y-bone fish fillet knife 100 may further include a notched groove 304 disposed into the bottom edge 116 of the shank 102 near the distal end 108 of the shank 102 and extending to a groove end 312, wherein edges inside the groove 304 are rounded. The rounded edges 312, 314, 316 inside the notched groove 304 are intentionally rounded so that they do not cut into the Y-bones of the fish fillet, but rather slide over them during the deboning cuts. According to this embodiment of method 600, Y-bone fish fillet knife 100 may further include a cutting tang 310 disposed at the distal end 108 of the shank 102. According to this particular embodiment of method 600, the cutting tang 310 may be bounded by the notched groove 304, a cutting edge 302, the distal end 108 of the knife shank 102 and the top edge 114 of the knife shank 102. According to this embodiment of method 600, Y-bone fish fillet knife 100 may include a handle 104 connected to the proximal end 106 of the knife shank 102.

The method of deboning a fish 600 may further include gripping 604 the handle 104. The user may grip 604 the handle 104 with either hand as the Y-bone fish fillet knife 100 and handle 104 are both designed for ambidextrous use. The method of deboning a fish 600 may further include cutting 606 adjacent and parallel to skeletal structure of the fish, wherein the Y-bones are guided into the notched groove 304 and slide along the groove end 312 during cutting 606.

According to another method of deboning a fish, the Y-bone fish fillet knife may further include an arcuate shaped cutting edge 302, e.g., as illustrated in FIGS. 1-3. However, other cutting edge 302 shapes are also contemplated to be within the scope of the present invention, for e.g., and not by way of limitation, straight, polygonal, serrated and any other suitable shape useful for filleting fish.

According to another method of deboning a fish, the Y-bone fish fillet knife may further include the cutting edge 302 of the Y-bone fish fillet knife 100 originating at a proximal sharp end 306 adjacent the notched groove 304 and extending along the cutting tang 310 to a distal sharp end 308 at the distal end 108 of the knife shank 102.

Having described particular embodiments of the Y-bone fish fillet knife 100, knife blade 200 and methods for deboning fish with Y-bones above with reference to the drawings, additional general embodiments will now be described. For example, an embodiment of a Y-bone knife blade is disclosed. The embodiment of a knife blade 200 may include a knife shank 102 having a proximal end 106 and a distal end 108 and a top edge 114 and a bottom edge 116. The embodiment of a knife blade 200 may further include a notched groove 304 disposed into the bottom edge 116 of the knife shank 102 near the distal end 108. According to this embodiment of knife blade 200, the edges 312, 314 and 316 inside the notched groove 304 may be rounded. The embodiment of a knife blade 200 may further include a cutting tang 310 disposed at the distal end 108 of the knife shank 102. The cutting tang 310 may be bounded by the notched groove 304, a cutting edge 302, the distal end 108 of the knife shank 102 and the top edge 114 of the knife shank 102.

According to another embodiment of a Y-bone knife blade, the cutting edge 302 may be arcuate in shape. Of course, other cutting edge 302 shapes are also contemplated to be within the scope of the present invention, for e.g., and not by way of limitation, straight, polygonal, serrated and any other suitable shape useful for filleting fish, according to unillustrated embodiments.

According to yet another embodiment of a Y-bone knife blade, a notch bisector angle, θ, formed between a first line parallel to the bottom edge of the knife shank and a second line bisecting the notched groove from the groove end may be less than 90°. Stated another way, the cutting tang 310 with its notched groove 304 is shaped like a hook back generally towards the handle 104 and proximal end of the shank 102.

According to still another embodiment of a Y-bone knife blade, the cutting edge 302 may originate at a proximal sharp end 306 adjacent the notched groove 304 and extends along the cutting tang 310 to a distal sharp end 308 at the distal end 108 of the knife shank 102. According to another embodiment of a Y-bone knife blade, the knife shank 102 may be formed of a material selected from the group consisting of: carbon steel, stainless steel, tool steel, alloy steel, cobalt alloy, titanium alloy and ceramics.

An embodiment of a Y-bone fish fillet knife 100 is disclosed. The embodiment of a Y-bone fish fillet knife 100 may include a knife shank 102 having a proximal end 106, a distal end 108, a top edge 114 and a bottom edge 116. The embodiment of a Y-bone fish fillet knife 100 may further include a notched groove 304 disposed into the bottom edge 116 of the shank 102 near the distal end 108 of the shank 102. According to a particular embodiment of the notched groove 304, the edges inside the groove 304 are rounded. The embodiment of a Y-bone fish fillet knife 100 may further include a cutting tang 310 disposed at the distal end 310 of the shank 102. According to one embodiment, the cutting tang 310 may be bounded by the notched groove 304, a cutting edge 302, the distal end 108 of the knife shank 102 and the top edge 114 of the knife shank 102. The embodiment of a Y-bone fish fillet knife 100 may further include a knife handle 104 connected to the proximal end 106 of the knife shank 102.

According to yet another embodiment of a Y-bone fish fillet knife 100, the cutting edge 302 may be arcuate. Again, other cutting edge 302 shapes are also contemplated to be within the scope of the present invention, for e.g., and not by way of limitation, straight, polygonal, serrated and any other suitable shape useful for filleting fish, according to unillustrated embodiments.

According to still another embodiment of a Y-bone fish fillet knife 100, a notch bisector angle, θ, formed between a first line parallel to the bottom edge of the knife shank 102 and a second line bisecting the notched groove 304 from the groove end 312 may less than 90°. Stated another way, the opening of the notched groove 304 generally angles back toward the proximal end 106, rather than toward the distal end 108.

According to another embodiment of a Y-bone fish fillet knife 100, the cutting edge 302 may originate at a proximal sharp end 306 adjacent the notched groove 304 and extends along the cutting tang 310 to a distal sharp end 308 at the distal end 108 of the knife shank 102. According to yet another embodiment of a Y-bone fish fillet knife 100, the knife handle 104 further comprises a finger indentation 112 on a bottom side 110 of the handle 104 for receiving a forefinger (not shown in the FIGS.) during gripping and use of the knife 100.

According to still another embodiment of a Y-bone fish fillet knife 100, the knife handle 104 may be constructed from any one of the following materials: plastic, carbon fiber composite, metal and metal alloy. According to still another embodiment of a Y-bone fish fillet knife 100, the knife shank 102 may be formed of any one of the following materials: carbon steel, stainless steel, tool steel, alloy steel, cobalt alloy, titanium alloy and ceramics.

The embodiments of a Y-bone knife disclosed here are designed to easily remove the Y-bones from the fish during the filleting process. The use of the Y-bone knife makes it unnecessary to individually remove each Y-bone with pliers or hemostats, or to cut a strip of flesh containing the severed Y-bones from the fillet, which may be required when using a conventional fillet knife. Use of the Y-bone knife disclosed herein saves time and does not require one to discard the strip of meat that contains the Y-bones when cut out in a secondary operation.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A Y-bone knife blade, comprising:
   a knife shank having a proximal end and a distal end and a top edge and a bottom edge;
   a notched groove disposed into the bottom edge of the shank near the distal end, wherein edges inside the notched groove are rounded; and
   a cutting tang disposed at the distal end of the shank, the cutting tang bounded by the notched groove, a cutting edge, the distal end of the knife shank and the top edge of the knife shank.

2. The Y-bone knife blade according to claim 1, wherein the cutting edge is arcuate.

3. The Y-bone knife blade according to claim 1, wherein a notch bisector angle, θ, formed between a first line parallel to the bottom edge of the knife shank and a second line bisecting the notched groove from the groove end is less than 90°.

4. The Y-bone knife blade according to claim 1, wherein the cutting edge begins at a proximal sharp end adjacent the notched groove and extends along the cutting tang to a distal sharp end at the distal end of the knife shank.

5. The Y-bone knife blade according to claim 1, wherein the knife shank is formed of a material selected from the group consisting of: carbon steel, stainless steel, tool steel, alloy steel, cobalt alloy, titanium alloy and ceramics.

6. A Y-bone fish fillet knife comprising:
   a knife shank having a proximal end, a distal end, a top edge and a bottom edge;
   a notched groove disposed into the bottom edge of the shank near the distal end of the shank, wherein edges inside the groove are rounded;
   a cutting tang disposed at the distal end of the shank, the cutting tang bounded by the notched groove, a cutting edge, the distal end of the knife shank and the top edge of the knife shank; and
   a handle connected to the proximal end of the knife shank.

7. The Y-bone fish fillet knife according to claim 6, wherein the cutting edge is arcuate.

8. The Y-bone fish fillet knife according to claim 6, wherein a notch bisector angle, θ, formed between a first line parallel to the bottom edge of the knife shank and a second line bisecting the notched groove from the groove end is less than 90°.

9. The Y-bone fish fillet knife according to claim 6, wherein the cutting edge begins at a proximal sharp end adjacent the notched groove and extends along the cutting tang to a distal sharp end at the distal end of the knife shank.

10. The Y-bone fish fillet knife according to claim 6, wherein the handle further comprises a finger indentation on a bottom side of the handle for receiving a forefinger during gripping and use of the knife.

11. The Y-bone fish fillet knife according to claim 6, wherein the handle further comprises a material selected from the group consisting of: plastic, carbon fiber composite, metal and metal alloy.

12. The Y-bone fish fillet knife according to claim 6, wherein the knife shank is formed of a material selected from the group consisting of: carbon steel, stainless steel, tool steel, alloy steel, cobalt alloy, titanium alloy and ceramics.

13. A method of deboning a fish, the fish having Y-bones inside, comprising:
   providing a Y-bone fish fillet knife, the Y-bone fish fillet knife comprising:
      a knife shank having a proximal end, a distal end, a top edge and a bottom edge;
      a notched groove disposed into the bottom edge of the shank near the distal end of the shank and extending to a groove end, wherein edges inside the groove are rounded;
      a cutting tang disposed at the distal end of the shank, the cutting tang bounded by the notched groove, a cutting edge, the distal end of the knife shank and the top edge of the knife shank; and
      a handle connected to the proximal end of the knife shank; and
   gripping the handle; and
   cutting adjacent and parallel to skeletal structure of the fish, wherein the Y-bones are guided into the notched groove and slide along the groove end during cutting.

14. The method according to claim 13, wherein the Y-bone fish fillet knife further comprises an arcuate shaped cutting edge.

15. The method according to claim 13, wherein the cutting edge of the Y-bone fish fillet knife begins at a proximal sharp end adjacent the notched groove and extends along the cutting tang to a distal sharp end at the distal end of the knife shank.

* * * * *